United States Patent
Lee

(10) Patent No.: US 12,463,276 B2
(45) Date of Patent: Nov. 4, 2025

(54) POUCH TYPE SECONDARY BATTERY AND BATTERY MODULE INCLUDING THE SAME

(71) Applicant: LG Energy Solution, Ltd., Seoul (KR)

(72) Inventor: Jaejin Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 651 days.

(21) Appl. No.: 17/792,051

(22) PCT Filed: Sep. 8, 2021

(86) PCT No.: PCT/KR2021/012232
§ 371 (c)(1),
(2) Date: Jul. 11, 2022

(87) PCT Pub. No.: WO2022/080673
PCT Pub. Date: Apr. 21, 2022

(65) Prior Publication Data
US 2023/0047002 A1    Feb. 16, 2023

(30) Foreign Application Priority Data

Oct. 16, 2020    (KR) .......................... 10-2020-0134562

(51) Int. Cl.
*H01M 50/178*        (2021.01)
*H01M 50/105*        (2021.01)
(Continued)

(52) U.S. Cl.
CPC ....... *H01M 50/178* (2021.01); *H01M 50/105* (2021.01); *H01M 50/124* (2021.01);
(Continued)

(58) Field of Classification Search
CPC ............. H01M 50/178; H01M 50/105; H01M 50/124; H01M 50/183; H01M 50/533;
(Continued)

(56) References Cited

U.S. PATENT DOCUMENTS

2017/0005302 A1    1/2017   Muroi
2019/0245189 A1    8/2019   Takei et al.

FOREIGN PATENT DOCUMENTS

CN    106104845 A    11/2016
CN    210805829 U    6/2020
(Continued)

OTHER PUBLICATIONS

International Search Report for Application No. PCT/KR2021/012232 mailed Jan. 3, 2022, pp. 1-3.
Extended European Search Report including Written Opinion for Application No. 21880321.1 dated Jun. 28, 2024.

*Primary Examiner* — Helen Oi K Conley
(74) *Attorney, Agent, or Firm* — Lerner David LLP

(57) ABSTRACT

A pouch type secondary battery according to an embodiment of the present disclosure is a pouch type secondary battery in which a cell assembly, including an electrode assembly in which a positive electrode and a negative electrode are stacked with a separator interposed therebetween, at least one electrode tab protruding from the electrode assembly, and an electrode lead connected to the electrode tab, is housed in a pouch case, wherein the secondary battery comprises a lead film positioned between the pouch case and the electrode lead, and wherein the lead film comprises a first sealing part in a region far from the electrode assembly and a second sealing part in a region close to the electrode assembly, and a thickness of the second sealing part is larger than a thickness of the first sealing part.

10 Claims, 5 Drawing Sheets

(51) Int. Cl.
*H01M 50/124* (2021.01)
*H01M 50/183* (2021.01)
*H01M 50/533* (2021.01)
*H01M 50/534* (2021.01)

(52) U.S. Cl.
CPC ....... *H01M 50/183* (2021.01); *H01M 50/533* (2021.01); *H01M 50/534* (2021.01)

(58) Field of Classification Search
CPC ............. H01M 50/534; H01M 50/119; H01M 50/121; H01M 50/193; H01M 50/186; H01M 10/052; H01M 50/172; H01M 50/116; H01M 50/543; Y02E 60/10
See application file for complete search history.

(56) References Cited

FOREIGN PATENT DOCUMENTS

| | | |
|---|---|---|
| JP | 2002279963 A | 9/2002 |
| JP | 2004111303 A | 4/2004 |
| JP | 2007026901 A | 2/2007 |
| JP | 2008016337 A | 1/2008 |
| JP | 2008293982 A | 12/2008 |
| JP | 2014120390 A | 6/2014 |
| JP | 2019023975 A | 2/2019 |
| JP | 2022042922 A | 3/2022 |
| KR | 101045858 B1 | 7/2011 |
| KR | 20140012601 A | 2/2014 |
| KR | 20160084066 A | 7/2016 |
| KR | 20160133041 A | 11/2016 |
| KR | 101846486 B1 | 4/2018 |
| KR | 102089415 B1 | 3/2020 |
| WO | 2015141772 A1 | 9/2015 |

[FIG. 1]
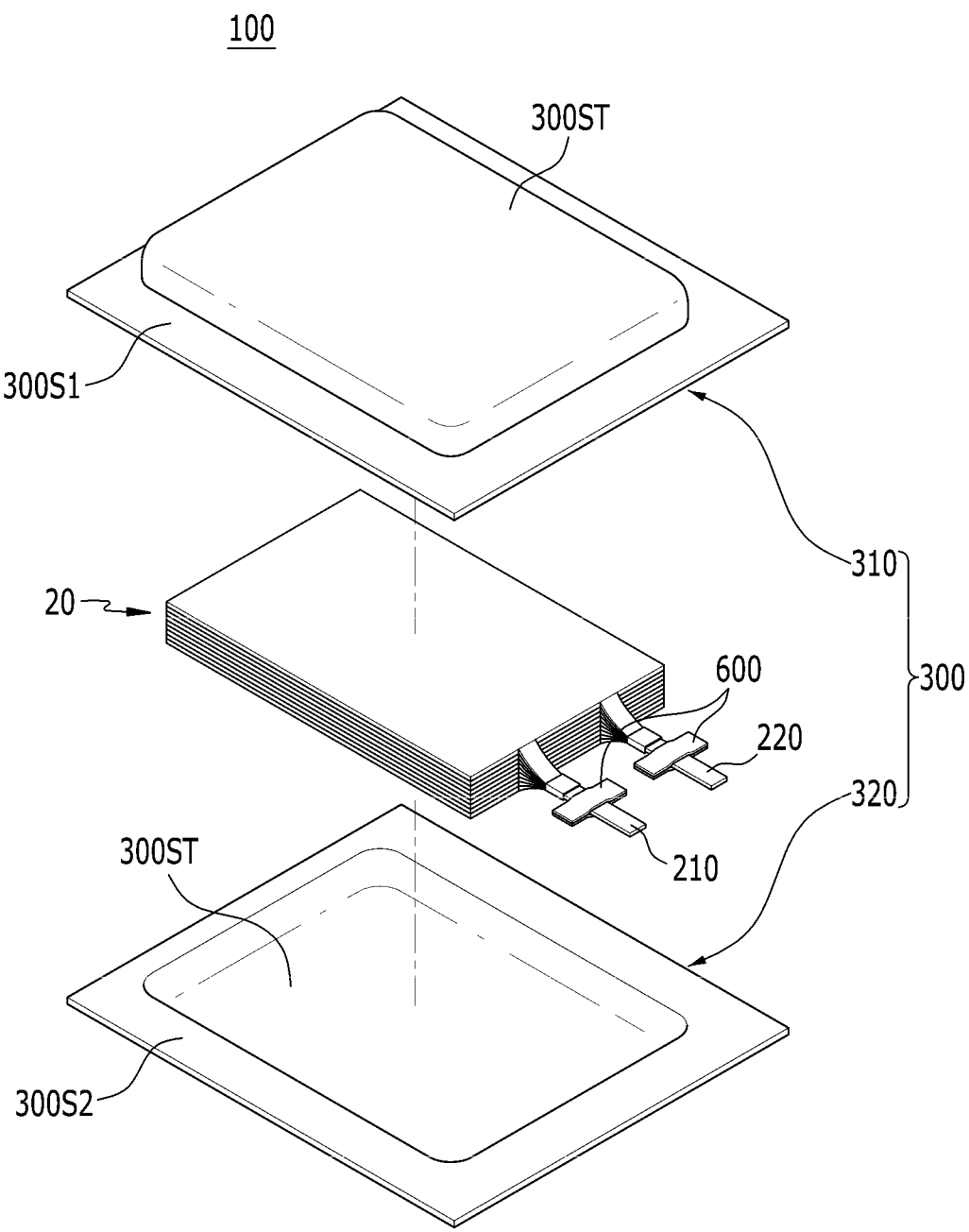

[FIG. 2]
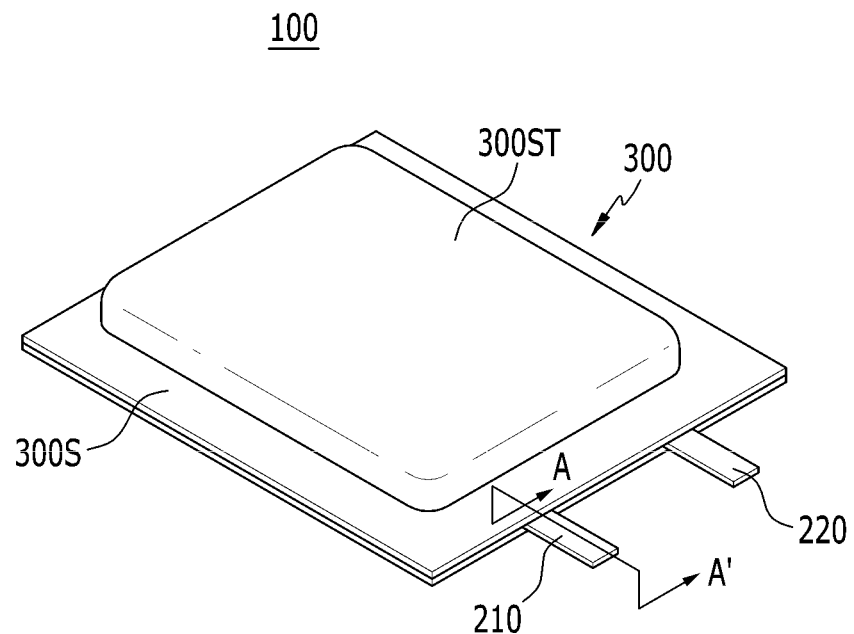
[FIG. 3]
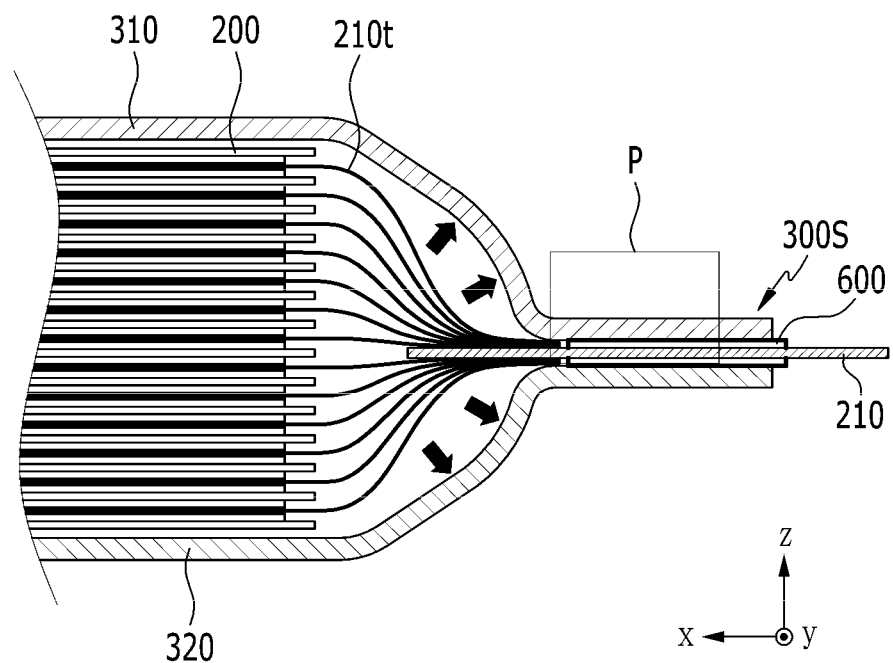

[FIG. 4]
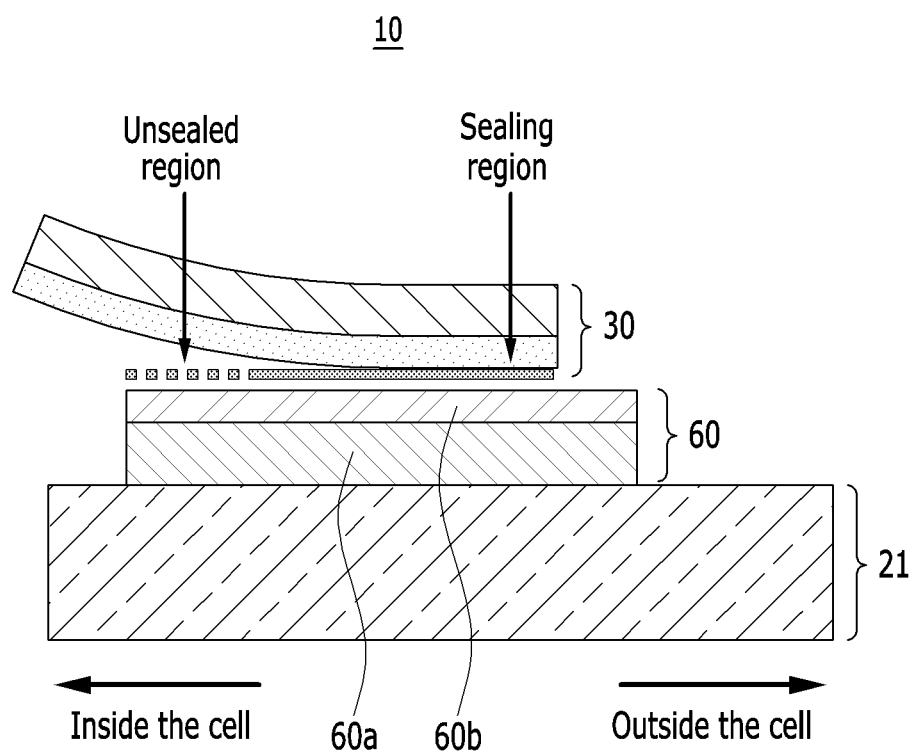

[FIG. 5]
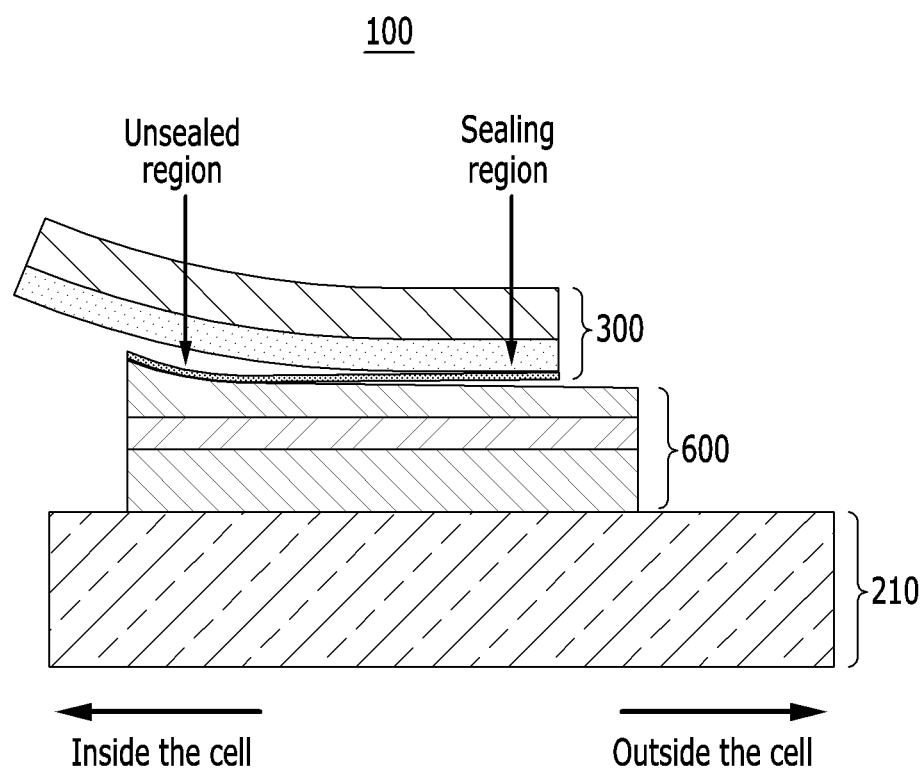

POUCH TYPE SECONDARY BATTERY AND BATTERY MODULE INCLUDING THE SAME

CROSS-REFERENCE TO RELATED APPLICATIONS

This application is a national phase entry under 35 U.S.C. § 371 of International Application No. PCT/KR2021/012232, filed on Sep. 8, 2021, published in Korean, which claims priority to Korean Patent Application No. 10-2020-0134562, filed on Oct. 16, 2020, the entire contents of which are hereby incorporated by reference herein in their entireties.

TECHNICAL FIELD

The present disclosure relates to a pouch type secondary battery and a battery module including same, and more particularly, to a pouch type secondary battery with improved sealing quality and a battery module including same

BACKGROUND

As energy prices are increasing due to the depletion of fossil fuels and increasing attention is being paid to environmental pollution, the demand for environmentally-friendly alternative energy sources acts as an essential factor for future life. Thus, research into techniques for generating various kinds of power, such as nuclear energy, solar energy, wind energy, and tidal power, is underway, and power storage apparatuses for more efficient use of the generated energy are also drawing much attention.

Particularly, as technology development and demands for mobile devices and electric vehicles increase, demands for batteries as energy sources are rapidly increasing.

Representatively, a lithium secondary battery such as lithium ion battery and lithium ion polymer battery having advantages such as high energy density, discharging voltage, and output stability shows high demand.

Based on the shape of a battery case, a secondary battery is classified into a cylindrical battery where an electrode assembly is mounted in a cylindrical metal can, a prismatic battery where an electrode assembly is mounted in a prismatic metal can, and a pouch type battery where an electrode assembly is mounted in a pouch type case formed of an aluminum laminate sheet.

In a pouch type secondary battery, a high temperature environment and a large amount of gas generated during a long-term cycle test may cause a vent in the sealing part of the pouch case and the electrode lead. For this reason, the safety problem of a secondary battery is emerging. In order to reduce this safety problem, it is necessary to improve the sealing quality of the pouch case and the electrode lead.

DETAILED DESCRIPTION OF THE INVENTION

Technical Problem

It is an object of the present disclosure to provide a pouch type battery cell with improved sealing quality and a secondary battery including the same.

However, the problem to be solved by embodiments of the present disclosure is not limited to the above-described problems, and can be variously expanded within the scope of the technical idea included in the present disclosure.

Technical Solution

According to an embodiment of the present disclosure, there is provided a pouch type secondary battery in which a cell assembly, including an electrode assembly in which a positive electrode and a negative electrode are stacked with a separator interposed therebetween, at least one electrode tab protruding from the electrode assembly, and an electrode lead connected to the electrode tab, is housed in a pouch case, wherein the secondary battery comprises a lead film positioned between the pouch case and the electrode lead, and wherein the lead film comprises a first sealing part in a region far from the electrode assembly and a second sealing part in a region close to the electrode assembly, and a thickness of the second sealing part is larger than a thickness of the first sealing part.

The portion of the pouch case corresponding to the second sealing part of the lead film may have a bent part that is bent by housing the electrode assembly having a larger thickness than a portion where the lead film and the pouch case are sealed.

The portion of the pouch case corresponding to the second sealing part of the lead film may be joined to the second sealing part of the lead film.

More specifically, both the first sealing part and the second sealing part may be joined to the pouch case.

The first sealing part may be formed by being pressed by a sealing tool.

The pouch case includes a resin layer and a metal layer, the lead film has a structure in which a first layer, a second layer and a third layer are sequentially stacked, and among the first layer, the second layer, and the third layer, the third layer is positioned closest to the pouch case, and the third layer may be formed of the same material as the resin layer of the pouch case.

The third layer has a first end close to the electrode assembly and a second end positioned on the opposite side of the first end, and a thickness of the first end may be larger than a thickness of the second end.

The first end of the third layer and the pouch case may be sealed to each other to form a sealing part.

The third layer may include polypropylene.

According to another embodiment of the present disclosure, there is provided a battery module comprising the above-mentioned pouch type secondary battery.

BRIEF DESCRIPTION OF THE DRAWINGS

FIG. 1 is an exploded perspective view illustrating a pouch type secondary battery according to an embodiment of the present disclosure;

FIG. 2 is a perspective view illustrating a state in which the pouch type secondary battery of FIG. 1 is assembled;

FIG. 3 is a cross-sectional view taken along the cutting line A-A' of FIG. 2;

FIG. 4 is a view showing a sealing region according to a comparative example of the present disclosure;

FIG. 5 is an enlarged cross-sectional view of a region P of FIG. 3; and

DETAILED DESCRIPTION OF THE EMBODIMENTS

Figure 6:
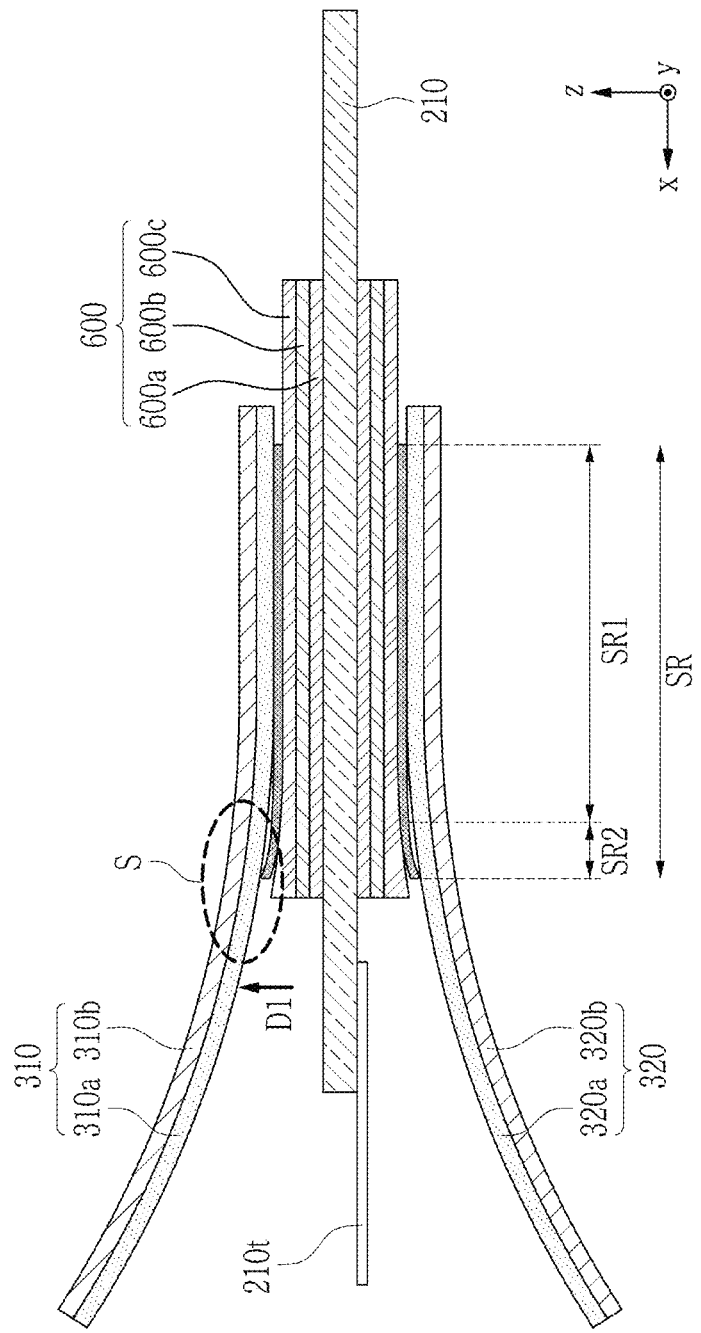
FIG. 6 is a detailed view specifically illustrating a pouch type secondary battery forming the sealing region of FIG. 5.

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

FIG. 1 is an exploded perspective view illustrating a pouch type secondary battery according to an embodiment of the present disclosure. FIG. 2 is a perspective view illustrating a state in which the pouch type secondary battery of FIG. 1 is assembled. FIG. 3 is a cross-sectional view taken along the cutting line A-A' of FIG. 2.

Referring to FIGS. 1 to 3, the pouch type secondary battery 100 according to the present embodiment can be manufactured by housing the electrode assembly 200 inside the pouch case 300 and then sealing the case. The electrode assembly 200 may include a positive electrode, a negative electrode, and a separator disposed between the positive electrode and the negative electrode. The electrode assembly 200 may be a stack type electrode assembly, a jelly-roll type electrode assembly, or a stack/folding-type electrode assembly.

Each of the positive electrode and the negative electrode includes an electrode tab 210*t*, and the electrode leads 210 and 220 each connected to the electrode tab 210*t* may be exposed to the outside of the pouch case 300. In addition, the electrode leads 210 and 220 can be positioned respectively in the sealing part 300S in a state of being covered with a lead film 600 so as to secure a sealing property and an insulation property.

The pouch case 300 is composed of a laminate sheet, and may include a resin layer for heat fusion and a metal layer for preventing material penetration.

Specifically, referring to FIG. 6, each of the upper case 310 and the lower case 320 may include an inner resin layer 310*a* for sealing, and a metal layer 310*b* for preventing material penetration. If necessary, each of the upper case 310 and the lower case 320 may further include an outermost outer resin layer (not shown).

The outer resin layer can have excellent tensile strength and weather resistance compared to its thickness and have electrical insulation property in order to protect the pouch type secondary battery 100 from the outside. The outer resin layer may include a polyethylene terephthalate (PET) resin or a nylon resin. The metal layers 310*b* and 320*b* can prevent air, moisture and the like from flowing into the pouch type secondary battery 100. The metal layers 310*b* and 320*b* may include aluminum (Al). The inner resin layers 310*a* and 320*a* may be heat-fused to each other by heat and pressure applied in a state where the electrode assembly 200 is built-in. The inner resin layer may include cast polypropylene (CPP) or polypropylene (PP).

Referring back to FIGS. 1 to 3, a recessed housing part 300ST in which the electrode assembly 200 can be seated can be formed in each of the upper case 310 and the lower case 320. Sealing parts 300S1 and 300S2 can be provided along the outer periphery of the housing part 300ST for each of the upper case 310 and the lower case 320. The sealing part 300S1 of the upper case 310 and the sealing part 300S2 of the lower case 320 can be heat-fused to each other to form the sealing part 300S and seal the pouch case 300.

In another embodiment of the present disclosure, one side of the upper case and one side of the lower case can be integrally connected to each other, and the remaining three sides can be heat-fused.

On the other hand, each of the plurality of positive electrodes and the plurality of negative electrodes included in the electrode assembly 200 may include a positive electrode tab and a negative electrode tab, to which electrode leads 210 and 220 are connected. Specifically, one of the electrode leads 210 and 220 may be a positive electrode lead, and the other one may be a negative electrode lead. As described above, the electrode leads 210 and 220 connected to the electrode assembly 200 protrude from one end part of the pouch case 300 and are exposed to the outside of the pouch case 300.

FIG. 4 is a view showing a sealing region according to a comparative example of the present disclosure.

Referring to FIG. 4, the lead film 60 included in the pouch type secondary battery 10 according to a comparative example includes a double resin layer. At this time, the lead film 60 may include an adhesive resin layer 60*a* and a heat-resistant resin layer 60*b*. By forming a structure in which the pouch case 30 is floated on one end part of the lead film 60 positioned inside the cell which is a direction adjacent to the electrode assembly, an unsealed region that is not sealed can be formed between the lead film 60 and the pouch case 30.

FIG. 5 is an enlarged cross-sectional view of a region P of FIG. 3. FIG. 6 is a detailed view specifically illustrating a pouch type secondary battery forming the sealing region of FIG. 5.

Referring to FIGS. 3, 5 and 6, the pouch type secondary battery 100 according to the present embodiment has a structure in which a cell assembly, including an electrode assembly 200, at least one electrode tab 210*t* protruding from the electrode assembly 200, and an electrode lead 210 connected to at least one electrode tab 210*t*, is housed in a pouch case 300. At this time, the lead film 600 is formed between the pouch case 300 and the electrode lead 210, and the thickness of the second sealing part SR2 of the lead film 600 in the region close to the electrode assembly 200 is larger than the thickness of the first sealing part SR1 of the lead film 600 in a region far from the electrode assembly.

As shown in FIG. 5, a portion of the pouch case 300 corresponding to the second sealing part of the lead film 600 has a bent part that is bent by housing the electrode assembly 200 having a larger thickness than a portion where the lead film 600 and the pouch case 300 are sealed. Unlike the comparative example described above, according to the present embodiment, the thickness of the second sealing part SR2 of the lead film 600 corresponding to the floating pouch case 300 is formed to be thick, and thus an additional sealing region can be formed. At this time, a portion of the pouch case 300 corresponding to the second sealing part SR2 of the lead film 600 can be joined to the second sealing part SR2 of the lead film 600. Therefore, the thickness of the second sealing part SR2 can also be structured so as to be gradually increased in the direction of the electrode assembly 200, according to the shape of the bent part of the pouch case 300.

Referring to FIG. 6, the sealing region SR in which the lead film 600 and the pouch case 300 are sealed corresponds to the entirety of the second sealing part SR2 positioned close to the electrode assembly 200 of FIG. 3, as compared with the first sealing part SR1 and the first sealing part SR1, and thus the pouch case 300 can be joined to both the first sealing part SR1 and the second sealing part SR2. At this time, the first sealing part SR1 can be formed by being pressed by a sealing tool, and when the first sealing part SR1 is formed, the outermost layer 600c of the lead film 600 melted by heat can be pushed by pressure to form the second sealing part SR2.

The lead film 600 according to the present embodiment may have a structure in which a first layer 600a, a second layer 600b and a third layer 600c are sequentially stacked. Among the first layer 600a, the second layer 600b and the third layer 600c, the third layer 600c is positioned closest to the pouch case 300, and the third layer 600c may be formed of the same material as the inner resin layer 310a of the pouch case 300, for example, polypropylene. The third layer 600c functions as an adhesive auxiliary layer, and the third layer 600c of the lead film 600 and the inner resin layer 310a of the pouch case 300 contacting with each other in this way are formed of the same material, thereby capable of improving the sealing quality.

The third layer 600c has a first end close to the electrode assembly 200 of FIG. 2, and a second end positioned on the opposite side of the first end, and a thickness of the first end may be larger than a thickness of the second end. The first end of the third layer 600c and the pouch case 300 may be sealed to each other to form a second sealing part SR2.

On the other hand, the pouch type secondary batteries according to the embodiments of the present disclosure are gathered by a plurality of numbers to constitute a battery module, and one or more of these battery modules can be packaged in a pack case to form a battery pack.

The above-mentioned battery module and battery pack including the same can be applied to various devices. Such a device can be applied to a vehicle means such as an electric bicycle, an electric vehicle, or a hybrid vehicle, but the present disclosure is not limited thereto, and is applicable to various devices capable of using a battery module, which also falls under the scope of the present disclosure.

Although the invention has been shown and described above with reference to the preferred embodiments, the scope of the present disclosure is not limited thereto, and numerous other modifications and improvements devised by those skilled in the art using the basic principles of the invention described in the appended claims will fall within the spirit and scope of the present disclosure.

DESCRIPTION OF REFERENCE NUMERALS

100: pouch type secondary battery
300: pouch case
310a, 320a: inner resin layer
600: lead film

INDUSTRIAL APPLICABILITY

According to embodiments of the present disclosure, the thickness of the inside of the lead film toward the battery cell is increased to increase the sealing region of the pouch case and the electrode lead, thereby improving the sealing quality.

In addition, an adhesive auxiliary layer in contact with the pouch case can be further formed on the double layer of the lead film, thereby improving the sealing quality.

The effects of the present disclosure are not limited to the effects mentioned above and additional other effects not described above will be clearly understood from the description of the appended claims by those skilled in the art.

The invention claimed is:

1. A pouch type secondary battery, comprising:
   a pouch case;
   a cell assembly, including an electrode assembly in which a positive electrode and a negative electrode are stacked with a separator interposed therebetween, at least one electrode tab protruding from the electrode assembly, and an electrode lead connected to the electrode tab, is housed in the pouch case, the electrode lead having a constant thickness in a direction perpendicular to a major surface of the electrode assembly;
   a lead film positioned between the pouch case and the electrode lead,
   wherein the lead film comprises a first sealing part in a first region remote from the electrode assembly and a second sealing part in a second region close to the electrode assembly, and a thickness of the second sealing part is greater than a thickness of the first sealing part,
   wherein the second sealing part of the lead film is entirely disposed within a sealing part of the pouch case, the sealing part being a portion of the pouch case where upper and lower portions of the pouch case are heat-fused to each other to seal the pouch case, and
   wherein the thickness of the second sealing part continuously increases from the first sealing part to an inner peripheral edge of the second sealing part remote from the first sealing part.

2. The pouch type secondary battery according to claim 1, wherein a portion of the pouch case adjacent to the second sealing part of the lead film has a bent part that is bent by housing the electrode assembly having a greater thickness than a thickness of a portion of the pouch case where the lead film and the pouch case are sealed.

3. The pouch type secondary battery according to claim 2, wherein the portion of the pouch case adjacent to the second sealing part of the lead film is joined to the second sealing part of the lead film.

4. The pouch type secondary battery according to claim 1, wherein both the first sealing part and the second sealing part are joined to the pouch case.

5. The pouch type secondary battery according to claim 4, wherein the first sealing part has structural evidence of being joined to the pouch case by being pressed by a sealing tool.

6. The pouch type secondary battery according to claim 1, wherein the pouch case comprises a resin layer and a metal layer,
   the lead film has a structure in which a first layer, a second layer and a third layer are sequentially stacked, and among the first layer, the second layer and the third layer, the third layer is positioned closest to the pouch case, and the third layer is formed of a same material as the resin layer of the pouch case.

7. The pouch type secondary battery according to claim 6, wherein the third layer has a first end close to the electrode assembly and a second end opposite from and remote from the first end, and a thickness of the first end is larger than a thickness of the second end.

8. The pouch type secondary battery according to claim 7, wherein the first end of the third layer and the pouch case are sealed to each other.

9. The pouch type secondary battery according to claim 7, wherein the third layer comprises polypropylene.

10. A battery module comprising the pouch type secondary battery according to claim 1.

* * * * *